May 23, 1967 V. S. LEVADI 3,321,614
ANALOG MULTIPLIER EMPLOYING RATIO INDICATING APPARATUS
Filed June 5, 1963 3 Sheets-Sheet 1

INVENTOR.
VICTOR S. LEVADI
BY
Roger W. Jensen
ATTORNEY

May 23, 1967   V. S. LEVADI   3,321,614
ANALOG MULTIPLIER EMPLOYING RATIO INDICATING APPARATUS
Filed June 5, 1963   3 Sheets-Sheet 2

INVENTOR.
VICTOR S. LEVADI
BY Roger W. Jensen
ATTORNEY

INVENTOR.
VICTOR S. LEVADI
BY Roger W. Jensen
ATTORNEY

United States Patent Office 3,321,614
Patented May 23, 1967

3,321,614
ANALOG MULTIPLIER EMPLOYING RATIO
INDICATING APPARATUS
Victor S. Levadi, Evanston, Ill., assignor to Honeywell
Inc., a corporation of Delaware
Filed June 5, 1963, Ser. No. 285,817
1 Claim. (Cl. 235—194)

This invention pertains generally to computers and more particularly to an analog computer which provides an output indicative of the ratio of the amplitudes of the input signals.

There are various testing applications in which ratio information is useful by itself, and a further application for use of this device is to place it in parallel with a summer, adder, comparator, differential, and an amplifier to provide a multiplication function of two signals. That is, by using this ratio indicator in the feedback loop around a summer, adder, comparator, differential and an amplifier, an output may be obtained which is indicative of the product of two input signals.

It is therefore an object of this invention to disclose apparatus which will provide an output indicative of the ratio of the amplitudes of the two input signals, whether these signals are alternating or unidirectional.

It is a further object of this invention to provide apparatus which will be usable in analog computers for obtaining a product from two input signals.

Further objects and advantages will be ascertained from a reading of the specification and claims in conjunction with the attached drawings in which:

Figure 3:
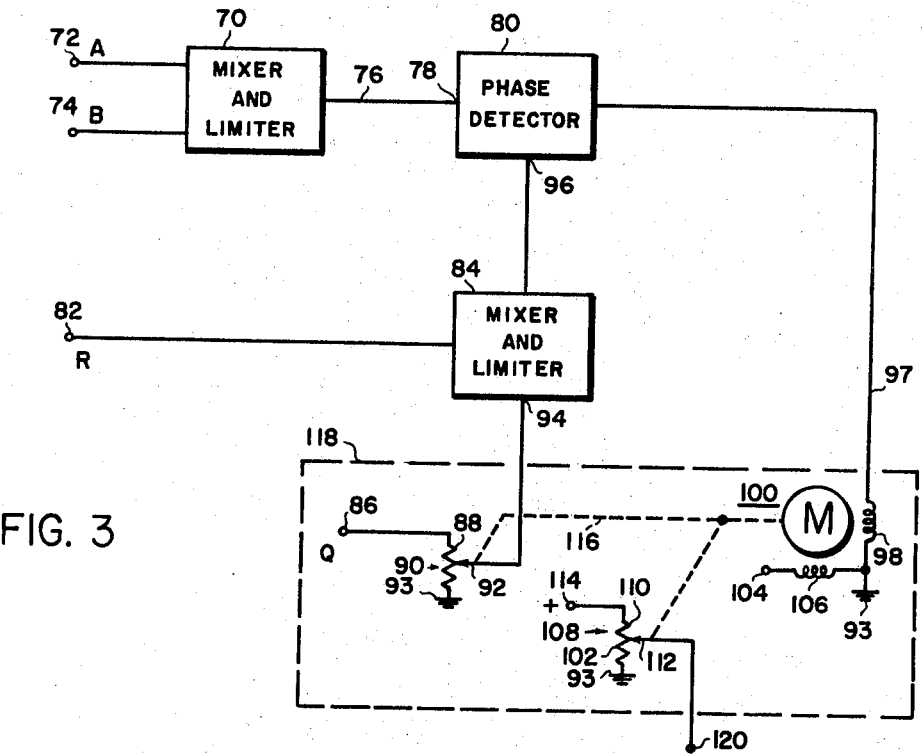
Figure 4:
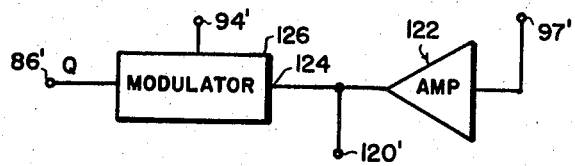
Figure 5:
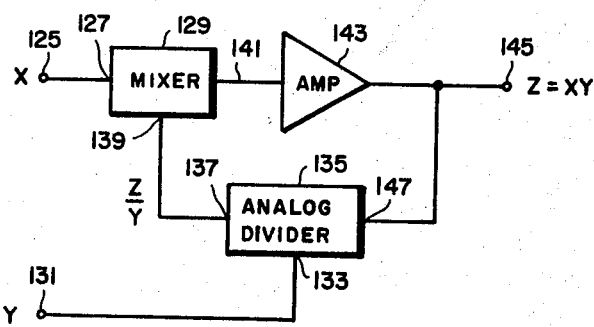
Figure 6:
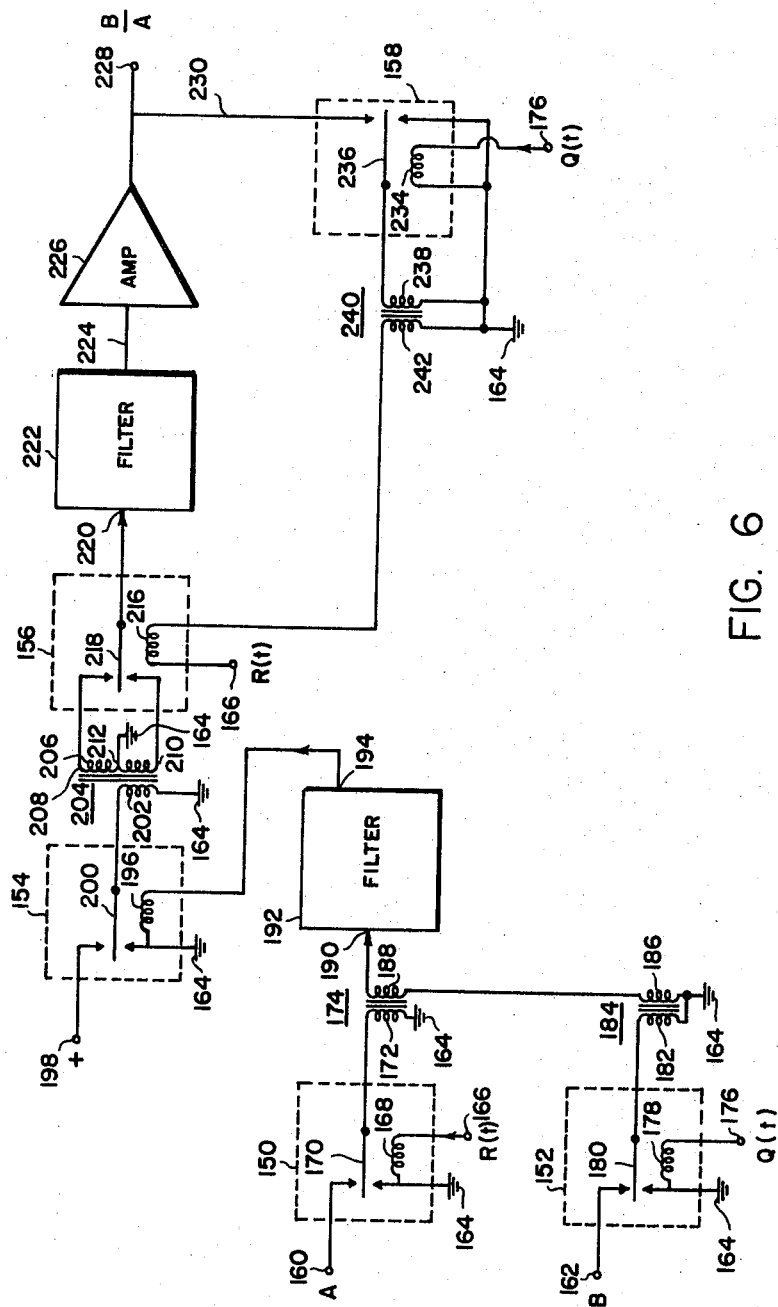

FIGURE 3 discloses another embodiment whereby the indication is provided automatically instead of manually;

FIGURE 4 provides an insert in the dashed box of FIGURE 3 for providing the adjustment electronically instead of mechanically;

FIGURE 5 is a block diagram of an embodiment for obtaining an output indicative of the product of two input signals; and FIGURE 6 is a schematic diagram of the system obtained when FIGURE 3 and FIGURE 4 are combined for obtaining the ratio of two direct voltages.

Figure 1:
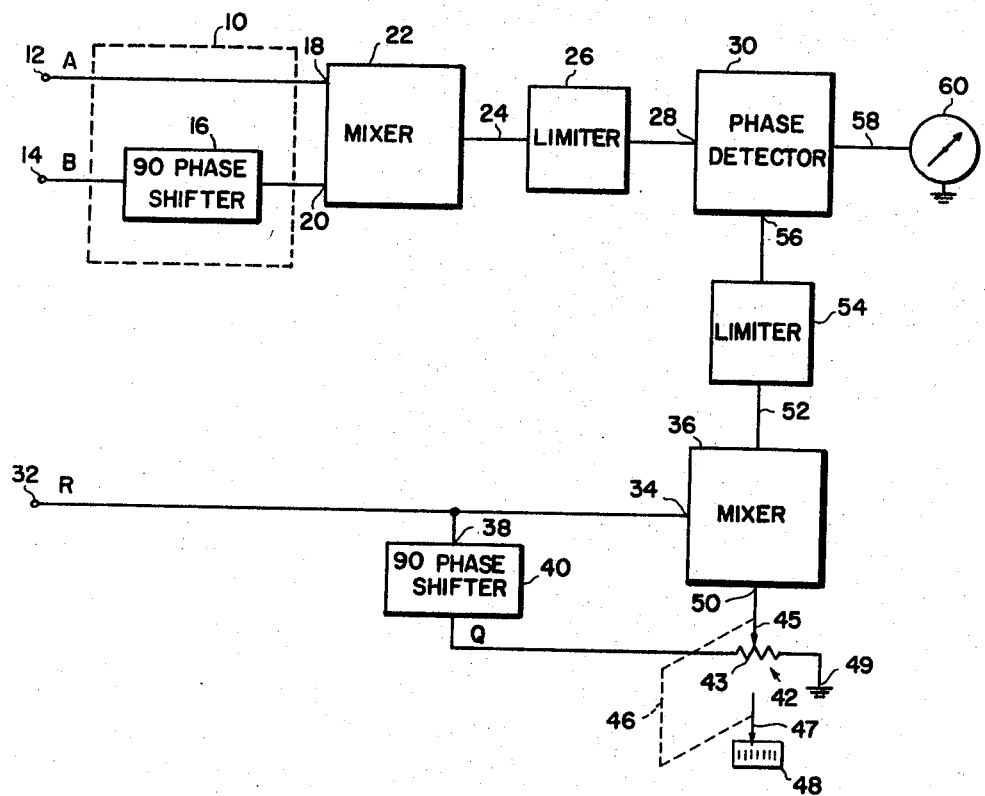
FIGURE 1 is a block diagram embodiment of a basic ratio indicating system wherein the input signals are of the alternating type.

In FIGURE 1, a box generally designated by dashed lines 10, contains input terminals 12 and 14. Within the box 10 there is a ninety degree phase shift circuit generally designated as 16 which receives an input from terminal 14. In this embodiment the input 12 is connected to a wire which merely runs through the box 10 to an input 18 on a mixer circuit, summing circuit, or combining circuit 22. The output of phase shifter 16 is connected to another input 20 of the mixer circuit 22. The output of mixer 22 is connected by a lead 24 to an input of a limiter circuit 26. The output of limiter 26 is connected to an input 28 of a phase detector circuit 30. Input leads 12 and 14 are signal leads and a third input terminal 32 is shown which is utilized as an input for a reference signal. The input terminal 32 is connected to an input 34 of a mixer circuit, summing circuit, or combining circuit 36 and also to an input 38 of a ninety degree phase shift circuit 40. A potentiometer generally designated as 42, having a resistance element 43 and a wiper 45, has the resistance element 43 connected between an output of the ninety degree phase shift circuit 40 and ground or reference potential 49. A mechanical connection indicated by dashed line 46 moves an indicator 47 on a scale 48 in response to movements of wiper 45.

The wiper 45 of potentiometer 42 is connected to a second input 50 of the mixer 36. A lead 52 connects the output of mixer 36 to an input of a limiter 54. The output of limiter 54 is connected to an input 56 of the phase detector 30. The output of phase detector 30 is connected by a lead 58 to the input of an indicating device 60.

Figure 2:
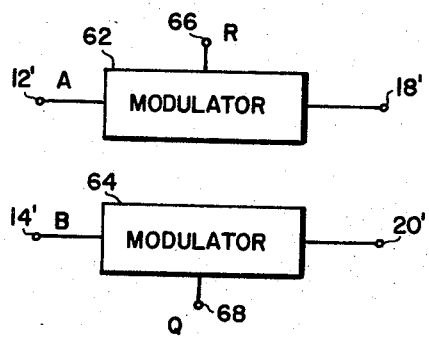
FIGURE 2 shows an insert to be used in the dashed box of FIGURE 1 in the event that the input signals are direct voltages.

In FIGURE 2, apparatus is shown which may be used in place of box 10 of FIGURE 1. An input 12' to a modulator 62 is adapted to be connected to input 12 of FIGURE 1. An input 14' to a modulator 64 is adapted to be connected, in FIGURE 1, to terminal 14. An input 66 is also connected to modulator 62 to be used as a reference or modulating signal. An input 68 is connected to modulator 64. The input 68 is the terminal used to provide the input reference or modulating signal for modulator 64. An output 18' of modulator 62 is adapted to be connected to input 18 of mixer 22 of FIGURE 1. Likewise, an output 20' of modulator 64 is adapted to be connected to the input 20 of mixer 22 in FIGURE 1.

FIGURE 3 discloses apparatus for mechanically obtaining an output signal by automatic means utilizing a motor to be later described. A combination mixer and limiter 70 has inputs 72 and 74. The inputs 72 and 74 correspond respectively to inputs 18 and 20 of mixer 22 in FIGURE 1. An output of the mixer and limiter 70 is connected by a lead 76 to an input 78 of a phase detector 80. A first reference input 82 is connected for supplying a reference signal to a mixer and limiter 84. A reference input terminal 86, which is to supply a signal ninety degrees out of phase with the signal supplied at terminal 82, is connected to one end of a resistance element 88 of a potentiometer generally designated as 90 having a resistance element 90 and a wiper 92. The other end of resistance element 88 is connected to ground or reference potential 93. The wiper 92 is connected electrically to an input 94 of the mixer and limiter 84. The output of mixer and limiter 84 is connected to an input 96 of the phase detector 80. An output of the phase detector 80 is connected through a lead 97 to supply a signal to a winding 98 of a motor generally designated as 100. The other side of the winding 98 of motor 100 is connected to ground 93. A terminal 104 is connected to one end of a reference winding 106 of the motor 100. The other end of the winding 106 is connected to ground 93. The terminal 104 is connected to a source of power which is not shown, but which would generally be ninety degrees out of phase with the signal supplied to winding 98. A potentiometer 108 having a resistance element 110 and a wiper 112 is shown connected between a voltage terminal 114 and ground 93. An output of the motor 100 is attached to the wipers 92 and 112 by a mechanical connection shown as a dashed line 116. The motor 100 along with the two potentiometers 90 and 108 are shown within a dashed line block generally designated as 118. The wiper 112 of potentiometer 108 is further connected electrically to an output terminal 120. Circuits 70 and 84 may additionally be termed summing or combining circuits.

FIGURE 4 is an insert which may be used in place of the block 118 of FIGURE 3. An input lead 97' corresponds to lead 97 in FIGURE 3 while a lead 120' corresponds to lead 120 of FIGURE 3. A terminal 86' corresponds to terminal 86 of FIGURE 3, and terminal 94' corresponds to terminal 94 which is the input to mixer 84 of FIGURE 3. Terminal 97' is connected to supply an input signal to an amplifier generally designated as 122. The output of amplifier 122 is connected to the terminal 120' and to an input 124 of a modulator 126. The lead 86' is connected to another input of modulator 126, while its output is connected to terminal 94'.

FIGURE 5 illustrates a multiplier system wherein a terminal 125 is connected to an input 127 of a mixer 129. A second input terminal 131 is connected to an input 133 of an analog divider 135. An output 137 of the analog divider 135 is connected to an input 139 of mixer 129. An output of the mixer 129 is connected by a lead 141 to an input of an amplifier 143. An output of the amplifier 143 is connected to an output terminal 145 and also to an input 147 of the analog divider 135.

In FIGURE 6 there are six mechanical devices enclosed in dashed line boxes. These boxes are mechanical vibrators or choppers and are used in different manners so as to provide mixing functions, modulating functions, and demodulating functions. These choppers are designated as 150, 152, 154, 156, and 158. An input lead 160 is connected to a first contact of the chopper 150. An input lead 162 is connected to a similar contact in chopper 152. A second contact in each of the choppers 150 and 152 is connected to reference potential or ground 164. An input 166 is connected to one end of a coil 168 in the chopper 150. The other end of coil 168 is connected to ground 164. The coil 168 operates a movable contact 170 in chopper 150 in accordance with an alternating signal supplied to terminal 166. The vibrating contact 170 is alternately connected to input 160 and ground 164. A permanent connection of vibrating contact 170 is connected to one end of a primary winding 172 of a transformer generally designated as 174. The other end of the primary winding 172 is connected to ground 164. An input 176 is connected to a coil 178 in the chopper 152. The other side of the winding 178 is connected to ground 164. The winding 178 operates a vibrating contact 180 of chopper 152 in a manner similar to that described for chopper 150. The permanent connection of vibrating contact 180 is connected to a primary winding 182 of a transformer generally designated as 184. The other end of the primary 182 is connected to ground 164. A secondary winding 186 of transformer 184 has one end connected to ground 164 and the other end connected to one end of a secondary winding 188 on transformer 174. The other end of the winding 188 is connected to an input 190 of a band-pass filter or filter means generally designated as 192. The windings 186 and 188 are connected so that their output signals are additive if the input signals to the primaries of the two transformers 174 and 184 are of the same frequency and phase. An output 194 of the band-pass filter 192 is connected to supply a signal to a coil 196 of the chopper 154. The other end of the coil 196 of chopper 154 is connected to one of the contacts of the chopper and to ground 164. The other contact of chopper 154 is connected to a terminal 198 which is connected to a source of power, not shown. A vibrating read or contact 200 in the chopper 154 has a permanent connection connected to a primary winding 202 of a transformer 204. The other end of primary 202 is connected to ground 164. A secondary winding 206 of transformer 204 has end leads 208 and 210 with an intermediate tap 212 connected to ground 164. The end leads 208 and 210 are connected to the stationary contacts in the chopper 156. The terminal 166 is also connected to a coil 216 in the chopper 156. A vibrating read or contact 218 in the chopper 156 is connected to an input 220 of a low pass filter network means 222. An output of the low pass filter 222 is connected by a lead 224 to an input of a high gain amplifier or amplifying means 226. An output of the amplifier 226 is connected to an output terminal 228 and also by a lead 230 to an input of chopper 158. The lead 230 is connected to one of the stationary contacts in chopper 158. The other stationary contact in chopper 158 is connected to ground 164. The terminal 176 is further connected to a coil 234 in chopper 158 while the other end of the coil 234 is connected to ground 164. A vibrating contact 236 in chopper 158 has a permanent connection to a primary winding 238 of a transformer generally designated as 240. The other end of the winding 238 is connected to ground 164. A secondary winding 242 of transformer 240 is connected between ground 164 and the other end of the coil 216 contained within chopper 156. As mentioned previously, FIGURE 6 is a circuit diagram of the block diagram resulting when FIGURE 4 is substituted into FIGURE 3. The sources of power for the amplifiers and other blocks have not been shown since some of the blocks may be designed so that external power sources are not required.

*Operation*

Referring first to FIGURE 1, it may be assumed that two signals A and B are applied to terminals 12 and 14, respectively, and are sine wave signals of the same frequency and of the same phase. The only differences between signals A and B are their amplitudes. It may be assumed that the amplitude of signal B is less than the amplitude of the signal A. After signal B is applied to the ninety degree phase shifter 16, it will become a signal of the same amplitude as previously, but will be shifted ninety degrees and as a result will be a cosine with respect to signal A. If these two signals are applied to an additive mixer, the resulting signal will be a signal having a phase which is indicative of the amplitudes of the signals A and B. Since a phase detector is sensitive to both amplitude and phase of an input signal, the mixed signal is applied to limiter 26 before being applied to the input 28 of phase detector 30. This means that the signal being applied to input 28 is always of a constant amplitude and merely varies in phase. It must be realized that the limiter 26 must limit the signal to less than will ever be obtained from the result of mixing the two input signals A and B. This can easily be accomplished if one is merely trying to obtain an indication of the amplitude of B with respect to a constant amplitude signal A, wherein signal A is merely set at a value larger than the limiting action of limiter 26. It may be further assumed that a signal R is applied at terminal 32. The signal R is a signal of the same frequency as A and is in phase with this signal. Signal R further is a signal of a constant amplitude, and is applied to both the mixer 36 and the input 38 of phase shifter 40. The output signal from phase shifter 40 is applied across potentiometer 42. This signal is a cosine signal with respect to signal R, and may be referred to as signal Q. As before, when sine and cosine signals are combined in a mixer, the output is indicative in phase of the amplitudes of the signals. The output signal from mixer 36 is then limited so that the phase detector responds only to the phase of the input signal. If the ratio of B to A is exactly the same as the ratio of the portion of Q appearing at wiper 46 to R, the signals being applied to limiters 26 and 54 will be of exactly the same phase. Under these conditions, the phase detector 30 will have zero output since it is only detecting differences in phase. If there is no output from phase detector 30, the indicator 60 will indicate a null or zero. At this time, the wiper 46 will be indicative of the ratio of signal B to signal A by its position on potentiometer 42 as compared with a full-scale reading. The ratio can be directly read through the pointer 47 on the appropriately inscribed scale 48.

FIGURE 2 shows an insert to be placed in dashed box 10 of FIGURE 1 when the input signals A and B are direct voltage signals. Signal A is modulated by sine wave R, while signal B is modulated by co-sine wave Q. The outputs are then signals of the same frequency as the reference signals and are of the same phase relationship. These signals are combined in the mixer 22 in the same fashion as described for FIGURE 1. As will be mentioned in conjunction with FIGURE 6, the modulators may be any suitable device capable of modulating a direct voltage signal by an alternating signal.

FIGURE 3 illustrates a method of automatically readjusting the wiper 92 on potentiometer 90 so that indication is obtained without the need for manual adjustment. The signals appearing at terminals 72 and 74 are sine and cosine signals respectively, and are the signals whose ratio is to be indicated. The signals are mixed and limited and applied to phase detector 80 in a manner similar to that described in FIGURE 1. The signal R is applied to mixer-limiter 84 and an input from the potentiometer 90 is applied through wiper 92 to the input 94 of mixer 84. The output of mixer and limiter 84 is applied to the input 96 of phase detector 80, and an output signal is obtained indicative of the phase difference of the two input signals. When an output is obtained, it is applied to the winding 98 of motor 100. This shold be a D.C. motor since the output of the phase detector is D.C. The input signal will cause motor 100 to adjust potentiometer wiper 92 to such a value that the phase detector will have zero output. When there is no further output signal from phase detector 80, this will indicate that potentiometer 92 is applying a signal to mixer 84, which is the same ratio to signal R as signal B applied to input 74 is to the signal A applied to the input 72. The motor 100 also adjusts the wiper 112 on potentiometer 108 and thus provides an output signal which is indicative of the ratio of the two input signals which are being measured.

FIGURE 4 is a block diagram which may be inserted for the dashed block 118 of FIGURE 3. This configuration will enable the circuit to accomplish the ratio indication electronically, and thereby eliminate moving parts which are a frequent source of break-down. The terminal 97′ is connected to line 97 from phase detector 80 and applies a signal to a high gain amplifier 122. The signal obtained from amplifier 122 is a direct voltage signal and will vary in amplitude. This signal appears at terminal 120 and is indicative of the ratio of signals A and B. The output signal obtained from amplifier 122 is also applied to input 124 of modulator 126, and is modulated by a signal Q, which is applied at terminal 86′. If the ratio of this direct voltage signal as modulated, compared with signal R, is not the same as signal B with respect to A, there will be an output obtained from phase detector 80 which is applied to amplifier 122 to again change the ratio. When the two ratios are identical, there will be a minimum output obtained from phase detector 80. As will be realized by those skilled in the art, the output from phase detector 80 will never be zero, but will be some very small amount necessary to obtain an output which, when amplified and modulated, will have a ratio as compared with R as is B to A.

The analog divider 135 in FIGURE 5, is another name for the ratio indicating apparatus which has been previously discussed. In other words, apparatus which provides an output which is the ratio of the inputs is also providing a dividing function. The apparatus of FIGURE 5 provides multiplication of the two input signals. The input signals may be direct voltages. An input multiplicand signal X is applied at terminal 125, and an input multiplier signal Y is applied at terminal 131. The signal X will be applied through mixer 129 to amplifier 143 and an output will be obtained. The output signal will be fed back as one of the inputs at 147 to analog divider 135. The output of analog divider 135 will be a ratio of the signal appearing at output terminal 145 divided by the signal Y applied at input terminal 131. As shown, the output of the analog divider 135 is Z/Y. When this signal Z/Y equals signal X, or very nearly equals it, a minimum output signal will be obtained from mixer 129 and the amplifier 143 will hold to that output voltage. The signal through the amplifier 143 is inverted in polarity so that actually the output signal Z is equal to −X times Y. Therefore, Z divided by Y is also a negative signal and this is the reason that the feedback loop will provide a minimum input signal to amplifier 143. It will be realized by those skilled in the art, that the output signal from mixer 129 will never be exactly zero, but will be some finite amount which becomes less and less as the gain of amplifier 143 is raised. In other words, the error of the system is dependent inversely upon the gain of amplifier 143. While direct voltages have been used in describing the embodiment of FIGURE 5, it will be apparent that the system is adaptable to modification for using alternating signals.

Reference will now be made to FIGURE 6 which shows a simple type of circuit diagram for obtaining the ratio indication. Input signals A and B, supplied to inputs 160 and 162 respectively, are direct voltages and are applied to the upper contacts of choppers 150 and 152 respectively. The output signals from the choppers are ninety degrees out of phase due to the signals R and Q, which are applied at terminals 166 and 176 respectively. These ninety degree out of phase signals are square waves. These square waves are summed and applied to band-pass filter 192. The band-pass filter will take out or remove the frequencies other than the frequency of the signals R and Q to produce somewhat of a sine wave from the distorted wave form obtained from combining the two signals appearing on the outputs of transformers 174 and 184. The output signal from band-pass filter 192 will be a signal which is dependent in phase upon the ratio of the amplitudes of two input signals and which is used to operate chopper 154. A steady state direct voltage is applied to terminal 198 so that the output signal applied to transformer 204 is of a constant amplitude, and of a phase determined by the output signal from band-pass filter 192. This signal from transformer 204 is passed through the chopper 156 to the low pass filter 222. Low pass filter 222 will only pass the direct voltage component of the signals. This direct voltage signal is applied to amplifier 226 and thus to the output terminal 228. This output signal is also applied to one of the terminals or contacts of chopper 158. This direct voltage signal is chopped by the signal Q so that the signal has the same phase as the signal being applied to transformer 174. As will be noted from the following discussion, there is a change in the polarity of the alternating signal between the primary and secondary of transformer 240 due to the selection of connections for the windings. This alternating signal is combined with the signal R being applied to terminal 166 in the chopper 156. The signal R is a constant amplitude signal, while the signal being obtained from chopper 158 varies in magnitude until the resulting signal phase being applied to chopper 156 is almost ninety degrees out of phase with the signal coming from transformer 204. When the last two mentioned signals are almost ninety degrees out of phase, there will be a minimum resulting direct voltage signal applied to low pass filter 222, and therefore, the output will be a very small amount. Again, as mentioned in conjunction with two of the other all electronic circuits, there will be a small signal necessary to produce the output B/A which is indicative of the ratio of the input signals and is also necessary to keep the phase of the output signal from chopper 156 at the right amount.

As will readily be realized, mechanical choppers are not the only means of producing the apparatus above described, there are many types of all electronic modulators and choppers that can be used, and this only one very simple means of implementing a workable unit.

The basic invention is obtaining an output signal from apparatus to which two input signals are applied, the output signal being indicative of the ratio of the input signals. The reference signal of a variable phase can be produced in any manner desired whereby an indication may be obtained which relates the phase of the two signals being compared to amplitude ratios. As an adaptation of the invention, FIGURE 5 is shown wherein the ratio apparatus is used to produce an analog multiplier. There are other uses, such as test equipment to which such apparatus may be put, and the invention is definitely not limited to the embodiments shown.

The various blocks which are shown but not described in detail are well known to those skilled in the art. Accordingly, for clarification, the circuit diagrams for these blocks have not been shown.

It is to be further understood that the invention is not limited to the terms used, and that it is to include all equivalents of the terms used in describing the individual items and the various components, and I wish to be limited only by the appended claim.

I claim as my invention:
Computer apparatus comprising, in combination:
mixer means including first and second input means and output means;
dividing means including first and second input means and output means;
means connected to said first input means of said mixer means for supplying thereto a multiplicand signal;
means connected to said first input means of said dividing means for supplying thereto a multiplier signal;
means connecting said output means of said dividing means to said second input means of said mixer means;
amplifying means including input and output means, said input means of said amplifying means being connected to said output means of said mixer means, said output means of said amplifying means being connected to said second input means of said dividing means; and
output terminal means connected for receiving signals from said output means of said amplifying means and adapted for providing an output indicative of the product of said input multiplicand and multiplier signals.

References Cited by the Examiner

UNITED STATES PATENTS 3,215,824  11/1965  Alexander et al. ___ 235—195 X

FOREIGN PATENTS 757,251  9/1956  Great Britain.

MALCOLM A. MORRISON, *Primary Examiner.*

M. P. HARTMAN, *Assistant Examiner.*